US011919028B2

(12) United States Patent
Thomson et al.

(10) Patent No.: US 11,919,028 B2
(45) Date of Patent: Mar. 5, 2024

(54) FLUID ATOMIZER

(71) Applicants: Rolls-Royce Corporation, Indianapolis, IN (US); Rolls-Royce plc, London (GB)

(72) Inventors: Neal Thomson, West Des Moines, IA (US); Christopher Walters, Birmingham (GB)

(73) Assignees: ROLLS-ROYCE CORPORATION, Indianapolis, IN (US); ROLLS-ROYCE PLC, London (GB)

( * ) Notice: Subject to any disclaimer, the term of this patent is extended or adjusted under 35 U.S.C. 154(b) by 316 days.

(21) Appl. No.: 17/204,519

(22) Filed: Mar. 17, 2021

(65) Prior Publication Data

US 2021/0197218 A1 Jul. 1, 2021

Related U.S. Application Data

(62) Division of application No. 16/178,046, filed on Nov. 1, 2018, now Pat. No. 10,967,394.

(51) Int. Cl.

*B05B 7/24* (2006.01)
*B05B 1/34* (2006.01)
*F02M 61/16* (2006.01)

(52) U.S. Cl.

CPC .......... *B05B 7/2489* (2013.01); *B05B 1/3431* (2013.01); *F02M 61/162* (2013.01)

(58) Field of Classification Search

CPC .... B05B 7/2489; B05B 1/3431; F02M 61/162
USPC .............................................................. 239/8
See application file for complete search history.

(56) References Cited

U.S. PATENT DOCUMENTS

| | | | |
|---|---|---|---|
| 3,254,846 A | 6/1966 | Schreter et al. | |
| 3,283,502 A | 11/1966 | Lefebvre | |
| 3,570,242 A | 3/1971 | Leonardi et al. | |
| 3,980,233 A | 9/1976 | Simmon et al. | |
| 4,754,922 A | 7/1988 | Halvorsen et al. | |
| 4,835,962 A | 6/1989 | Rutter | |
| 5,044,559 A | 9/1991 | Russell et al. | |
| 5,605,287 A | 2/1997 | Mains | |
| 5,761,907 A | 6/1998 | Pelletier et al. | |
| 5,799,872 A | 9/1998 | Nesbitt et al. | |
| 6,076,356 A | 6/2000 | Pelletier | |
| 6,247,317 B1 * | 6/2001 | Kostka | F23C 7/02 60/741 |

(Continued)

*Primary Examiner* — Chee-Chong Lee
(74) *Attorney, Agent, or Firm* — Crowell & Moring LLP

(57) ABSTRACT

A fluid atomizer and methods of atomizing fluids are disclosed. The fluid atomizer may comprise an inner member and one or more outer members. The inner member defines an interior conduit for providing a first-fluid flowpath from a supply end of the atomizer to a discharge end of the atomizer along a central axis. The one or more outer members are positioned radially outward of the inner member from the central axis. The inner and outer members define a second-fluid flowpath extending from a second-fluid supply conduit to a second-fluid discharge plenum. The second-fluid flowpath comprises a tangential conduit spiraling along the axis from the second-fluid supply conduit to a terminal end; an annulus downstream from and in fluid communication with the tangential conduit; and a second-fluid discharge plenum downstream from and in fluid communication with the annulus.

18 Claims, 8 Drawing Sheets

(56) References Cited

U.S. PATENT DOCUMENTS

| | | | | |
|---|---|---|---|---|
| 6,289,676 | B1 * | 9/2001 | Prociw | F23D 11/383 60/740 |
| 6,622,488 | B2 | 9/2003 | Mansour et al. | |
| 8,661,824 | B2 | 3/2014 | Pelletier et al. | |

* cited by examiner

FLUID ATOMIZER

CROSS REFERENCE TO RELATED APPLICATIONS

This application is a divisional application of, and claims priority under 35 USC § 120 to U.S. non-provisional application Ser. No. 16/178,046, filed Nov. 1, 2018, the entire contents of which are incorporated by reference.

BACKGROUND

Fluid atomizers are used to break a bulk fluid into droplets. For example, fuel injectors direct fuel from a fuel manifold as a bulk fluid to a combustion chamber where the fuel is broken into droplets. A typical fuel injector may comprise a fuel nozzle located within the combustion chamber and a fuel supply conduit coupled between the fuel manifold and the fuel nozzle. The fuel nozzle may atomize the fuel as the fuel is directed into the combustion chamber. In an airblast-type fuel nozzle, conduits for high pressure air may be positioned proximate the fuel nozzle such that high pressure air is directed into the fuel ejected from the fuel nozzle, thus aiding atomization. As but one example, such fuel injectors may be used in a gas turbine engine.

A typical fuel nozzle comprises an inner member and outer member, with a fuel flowpath defined between the members. Fuel may be supplied from the fuel manifold via a fuel supply conduit. Fuel is received in the flowpath defined between the inner member and outer member, and flows through the flowpath until ejected from the fuel nozzle. However, existing fuel nozzles generally require complex machining of one or both of the members to form intricate flowpaths designed to improve atomization of the fuel.

SUMMARY

According to some aspects of the present disclosure, a fluid atomizer comprises an inner member, an upstream outer member, and a downstream outer member. The inner member has an axis and defines an interior first-fluid flowpath extending from an upstream end of the inner member to a downstream end of the inner member along the axis. The upstream outer member is positioned radially outward from a portion of the inner member proximate the upstream end of the inner member. The upstream outer member defines a second-fluid supply conduit. The downstream outer member is positioned radially outward from a portion of the inner member extending from the upstream outer member to the downstream end of the inner member. The inner member, upstream outer member, and downstream outer member define a second-fluid flowpath extending from the second-fluid supply conduit to the downstream end of the inner member. The second-fluid flowpath comprises a conduit, and annulus, and a discharge plenum. The conduit extends from an entry plenum in fluid communication with the second-fluid supply conduit to an exit plenum spaced circumferentially from and axially downstream of the entry plenum. The annulus is downstream from and in fluid communication with the exit plenum. The discharge plenum is downstream from and in fluid communication with the annulus.

In some embodiments the second-fluid flowpath comprises a plurality of swirl slots providing fluid communication between the exit plenum and the annulus. In some embodiments an axis of one or more of the swirl slots is linear.

In some embodiments a radial dimension of the entry plenum is greater than a radial dimension of the exit plenum. In some embodiments an axial dimension of the entry plenum is greater than an axial dimension of the exit plenum. In some embodiments a terminal end of the exit plenum is circumferentially displaced from the second-fluid supply conduit so that the conduit extending therebetween circumscribes the inner member by less than 360 degrees.

In some embodiments the second-fluid flowpath comprises a plurality of swirl slots providing fluid communication between the annulus and the discharge plenum. In some embodiments an axis of one or more of the swirl slots is linear.

In some embodiments the fluid atomizer further comprises a first-fluid conduit positioned radially outward of the downstream outer member. In some embodiments the fluid atomizer further comprises a first-fluid conduit positioned radially inward of the inner member.

In some embodiments the conduit is partially bounded by an upstream wall, and wherein the upstream wall has a first axial position proximate the entry plenum and a second axial position proximate the exit plenum, the first axial position displaced from the second axial position. In some embodiments the upstream outer member and the downstream outer member are formed as a unitary member. In some embodiments at least a portion of the conduit is formed with a mill cutter having an axial dimension greater than the axial dimension of the conduit.

According to further aspects of the present disclosure, a fluid atomizer comprises an inner member and one or more outer members. The inner member defines an interior conduit for providing a first-fluid flowpath from a supply end of the atomizer to a discharge end of the atomizer along a central axis. The one or more outer members are positioned radially outward of the inner member from the central axis. The inner and outer members define a second-fluid flowpath extending from a second-fluid supply conduit proximate the supply end of the atomizer to a second-fluid discharge plenum proximate the discharge end of the atomizer. The second-fluid flowpath comprises a tangential conduit, an annulus, and a second-fluid discharge plenum. The tangential conduit spirals along the axis from the second-fluid supply conduit to a terminal end. The annulus is downstream from and in fluid communication with the tangential conduit. The second-fluid discharge plenum is downstream from and in fluid communication with the annulus.

In some embodiments the second-fluid flowpath comprises a plurality of swirl slots providing fluid communication between the tangential conduit and the annulus. In some embodiments an axis of one or more of the swirl slots is linear. In some embodiments the tangential conduit circumscribes the inner member by less than 360 degrees. In some embodiments the tangential conduit terminates at a swirl slot.

According to further aspects of the present disclosure, a method of atomizing a fluid is presented. The method comprises coupling an inner member having an axis and defining an interior first-fluid flowpath to a first outer member defining a second-fluid supply conduit; coupling the inner member to a second outer member, wherein the inner member, first outer member, and second outer member define a second-fluid flowpath, the second-fluid flowpath comprising a tangential conduit spiraling along the axis from the second-fluid supply conduit to a terminal end, an annulus downstream from and in fluid communication with the tangential conduit, and a discharge plenum downstream from and in fluid communication with the annulus; and directing fluid from the second-fluid supply conduit through the second-fluid flowpath.

In some embodiments the method further comprises mixing fluid discharged from the discharge plenum with a fluid flowing through the first-fluid flowpath.

BRIEF DESCRIPTION OF THE DRAWINGS

The following will be apparent from elements of the figures, which are provided for illustrative purposes.

Figure 1:
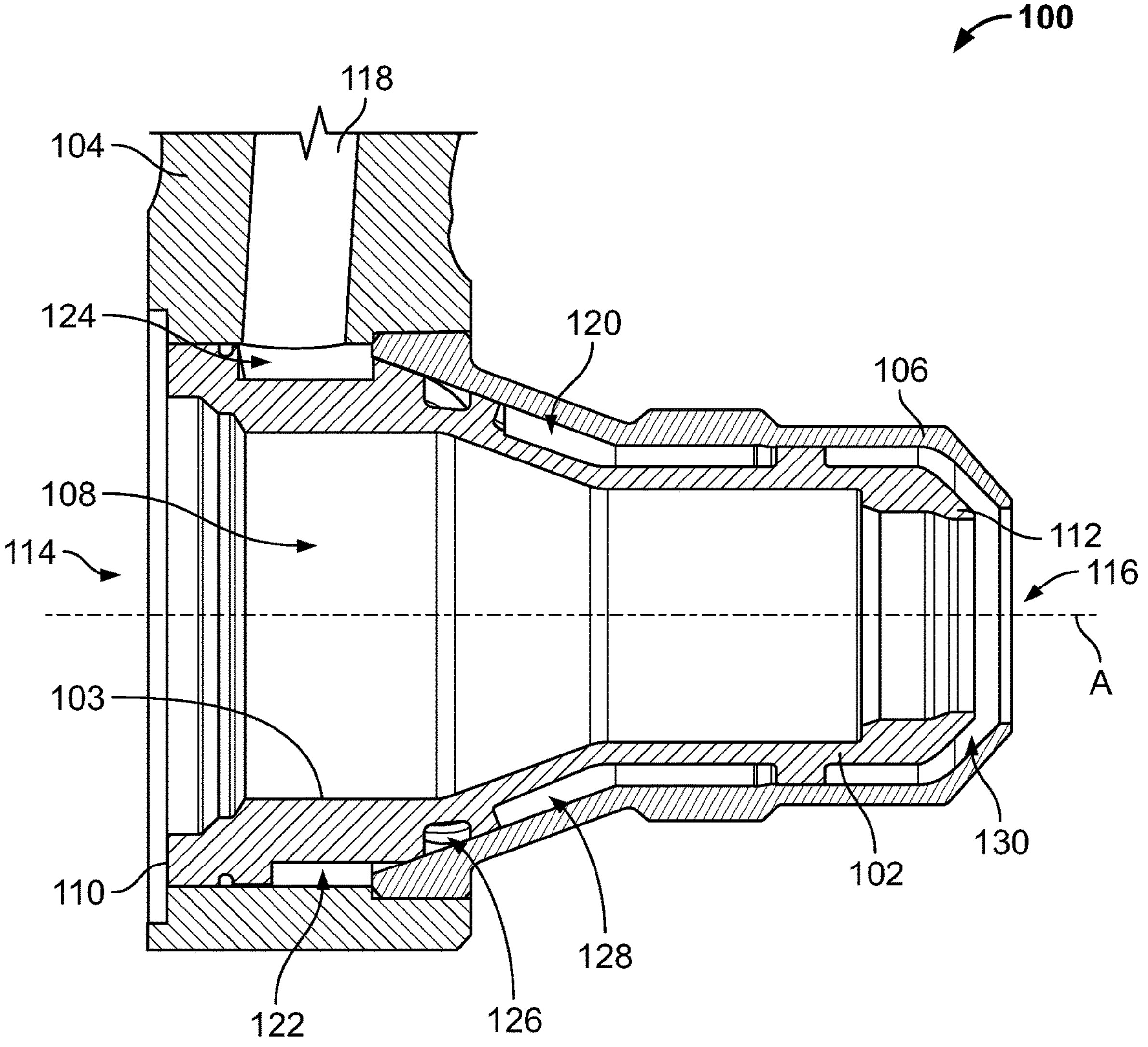
FIG. 1 is a schematic cross-sectional view of a fluid atomizer in accordance with some embodiments of the present disclosure.

The present application discloses illustrative (i.e., example) embodiments. The claimed inventions are not limited to the illustrative embodiments. Therefore, many implementations of the claims will be different than the illustrative embodiments. Various modifications can be made to the claimed inventions without departing from the spirit and scope of the disclosure. The claims are intended to cover implementations with such modifications.

DETAILED DESCRIPTION

For the purposes of promoting an understanding of the principles of the disclosure, reference will now be made to a number of illustrative embodiments in the drawings and specific language will be used to describe the same.

The present disclosure is directed to a fluid atomizer that eliminates or reduces the aforementioned deficiencies in existing fluid atomizers (such as fuel nozzles). Namely, the present disclosure is directed to a fluid atomizer that eliminates or reduces the complex machining required to manufacture the component, while maintaining performance of the fluid atomizer. The present disclosure is therefore directed to a fluid atomizer having a tangential, non-annular conduit for receiving a fluid, a plurality of linear swirl slots for transmitting the fluid to an annulus, and a discharge plenum for ejecting the fluid. The fluid may be mixed upon discharge from the fluid atomizer with one or more additional fluid streams.

FIG. 1 is a schematic cross-sectional view of a fluid atomizer 100 in accordance with some embodiments of the present disclosure. The fluid atomizer 100 comprises an inner member 102, upstream outer member 104, and downstream outer member 106. The inner member 102, upstream outer member 104, and downstream outer member 106 each at least partially define a fluid flowpath described in greater detail below. The fluid atomizer 100 generally has a supply end 114 and a discharge end 116. In some embodiments, the fluid supplied to, flowing through, and atomized by the fluid atomizer 100 may be fuel.

The inner member 102 has an axis A. In the illustration of FIG. 1, the axis A proceeds from left to right with the left side generally referred to as "upstream" and the right side generally referred to as "downstream."

The inner member 102 may be annular. The inner member 102 defines an interior first-fluid flowpath 108 extending from an upstream end 110 of the inner member 102 to a downstream end 112 of the inner member 102. The first-fluid flowpath 108 may extend along the axis A. The first-fluid flowpath 108 may direct a first fluid generally from the upstream end 110 to the downstream end 112. In some embodiments, the first fluid flowing through the first-fluid flowpath 108 may be air. The first-fluid flowpath 108 may be defined by an interior conduit 103 of the inner member 102.

The upstream outer member 104 may be positioned radially outward from the inner member 102 and/or a portion of the inner member 102 and/or the axis A. The upstream outer member 104 may be coupled to the inner member 102. The upstream outer member 104 may be positioned proximate the upstream end 110 of the inner member 102. The upstream outer member 104 may define a second fluid supply conduit 118.

The second fluid supply conduit 118 may direct a second fluid in a radially inward direction, and may direct the second fluid toward the inner member 102. In some embodiments the second fluid may be fuel. In some embodiments the second fluid is a fluid intended to be atomized. The second fluid supply conduit 118 may define a second fluid flowpath.

The downstream outer member 106 may be positioned radially outward from the inner member 102 and/or a portion of the inner member 102 and/or the axis A. The downstream outer member 106 may be annular, and may be co-axial with the inner member 102. The downstream outer member 106 may be coupled to one or both of the inner member 102 and the upstream outer member 104. The downstream outer member 106 may be positioned proximate the downstream end 112 of the inner member 102.

The inner member 102, upstream outer member 104, and downstream outer member 106 define a second fluid flowpath 120. The second fluid flowpath 120 may extend generally from proximate the supply end 114 to proximate the discharge end 116 of the fluid atomizer 100. The second fluid flowpath 120 may extend from the second fluid supply conduit 118 to the downstream end 112 of the inner member 102.

The second fluid flowpath 120 may comprise a conduit 122, a plurality of swirl slots 126, an annulus 128, and a discharge plenum 130. The conduit 122 may be referred to as a tangential conduit. The tangential conduit 122 may extend from an entry plenum 124 in fluid communication with the second fluid supply conduit 118 to an exit plenum (shown in later figures) spaced circumferentially from and axially downstream of the entry plenum 124. The annulus 128 may be positioned downstream from and in fluid communication with the tangential conduit 122. The discharge plenum 130 may be positioned downstream from and in fluid communication with the annulus 128.

The plurality of swirl slots 126 may provide fluid communication between the exit plenum and the annulus 128. The fluid received at the annulus 128 from the swirl slots 126 may be flowing in a co-swirling or counter-swirling direction.

During operation, a first fluid such as air may be directed under pressure through the first fluid flowpath 108. A second fluid such as fuel may be directed under pressure through the second fluid flowpath 120 and ejected from the discharge plenum 130 to be mixed with, and atomized by, the first fluid. The second fluid may be supplied to the second fluid flowpath 120 via the second fluid supply conduit 118. The second fluid may flow from the entry plenum 124 of the tangential conduit 122 into one or more of the plurality of swirl slots 126, then into the annulus 128 and discharge plenum 130 before being ejected under pressure from the discharge plenum 130 and into the flow of the first fluid. In other embodiments, a flow of first fluid may be provided exterior to the inner member 102, for example via a first fluid conduit positioned radially outward from the downstream outer member 106.

Figure 2:
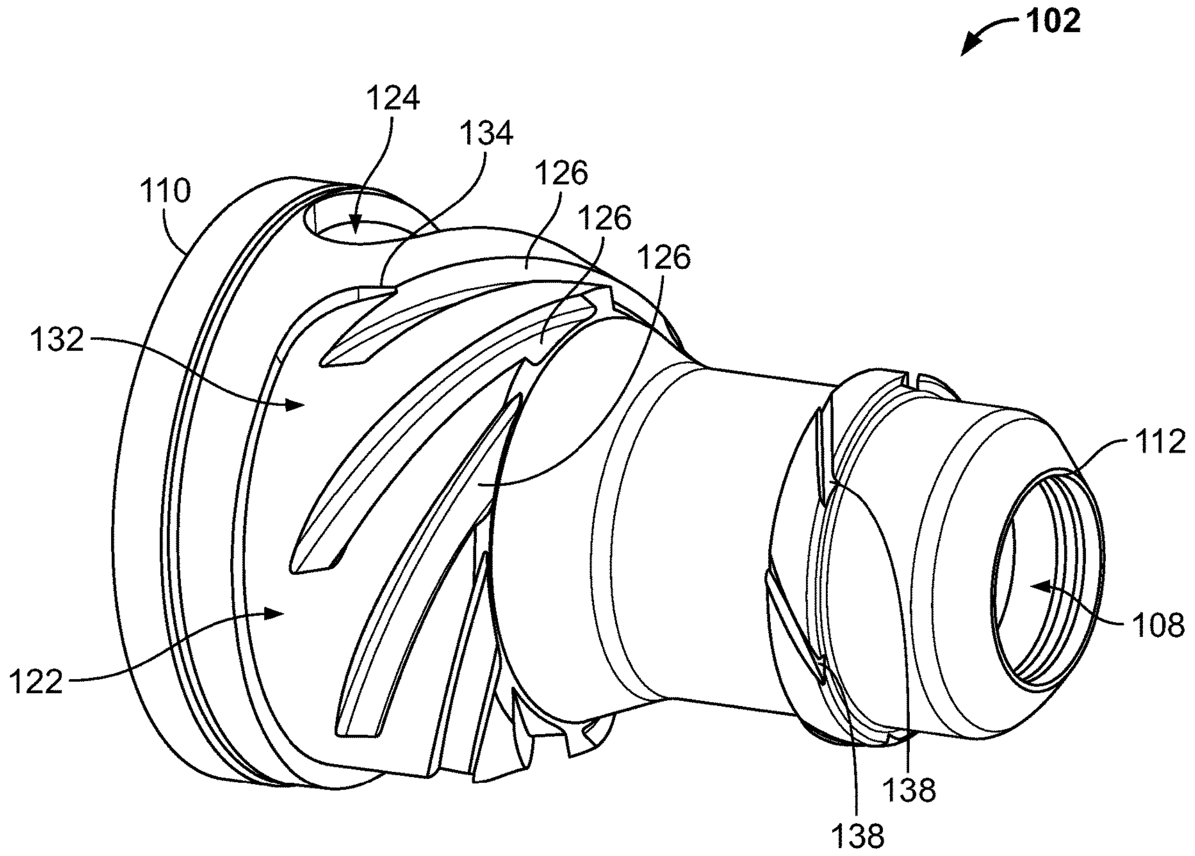
FIG. 2 is an isometric view of an inner member of a fluid atomizer in accordance with some embodiments of the present disclosure.
Figure 3:
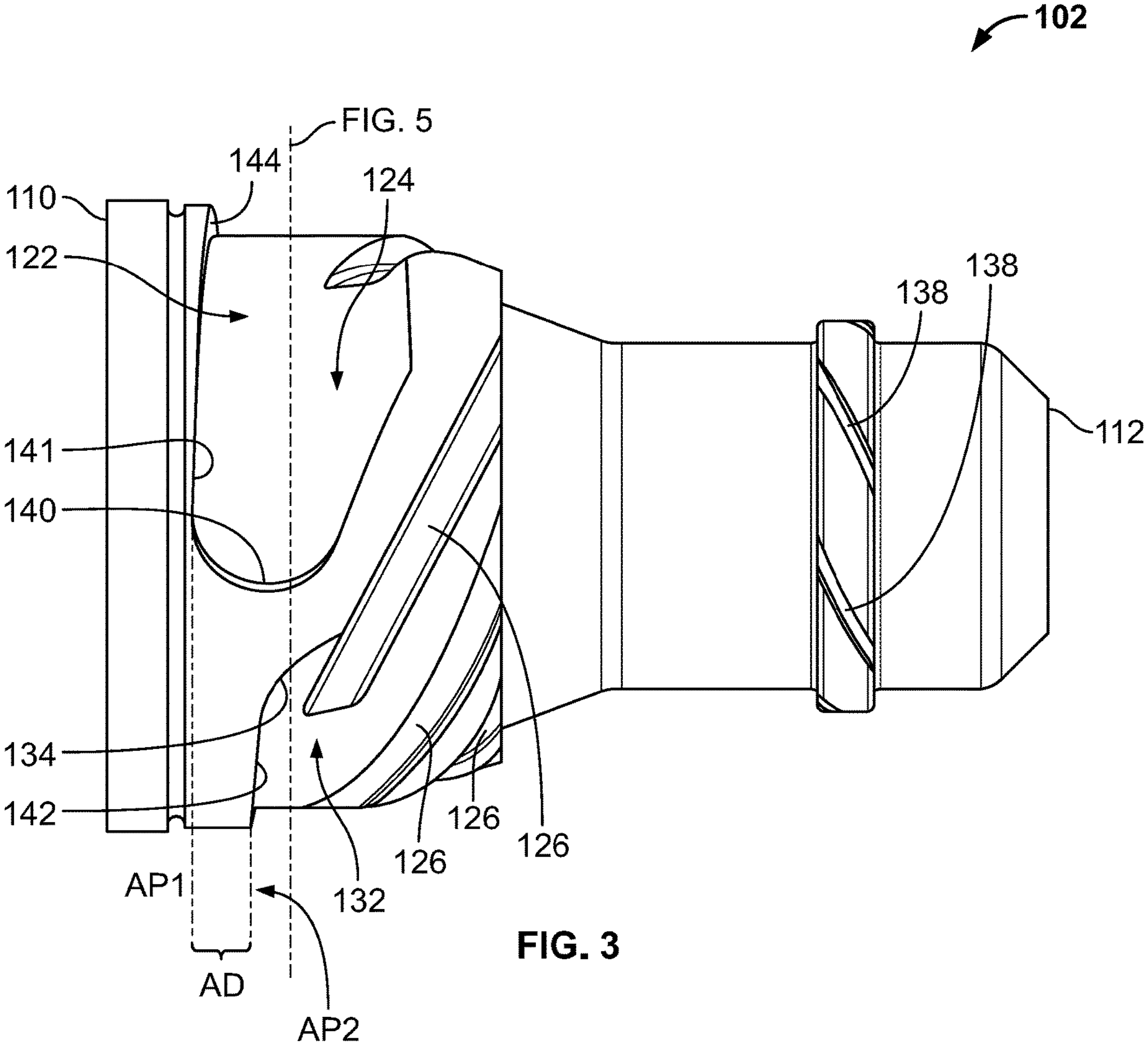
FIG. 3 is a profile view of an inner member of a fluid atomizer viewed along an axis of the inner member, in accordance with some embodiments of the present disclosure.
Figure 4:
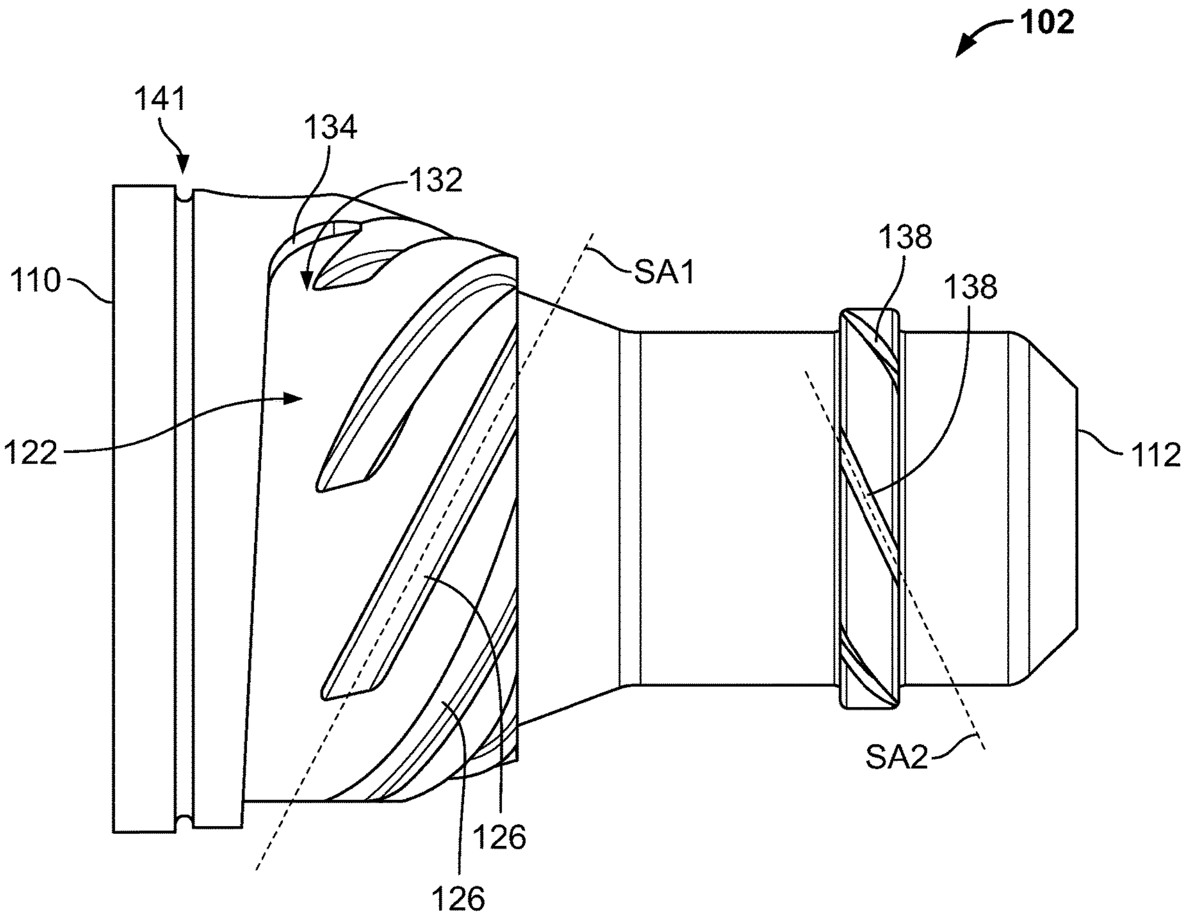
FIG. 4 is a profile view of an inner member of a fluid atomizer viewed along an axis of the inner member, in accordance with some embodiments of the present disclosure.
Figure 5:
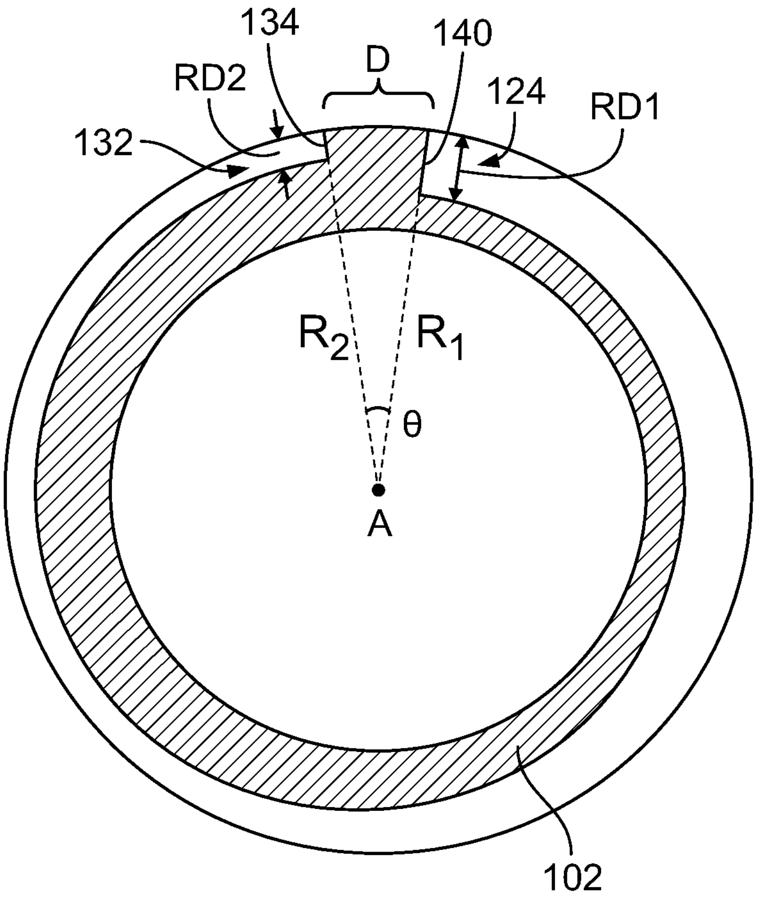
FIG. 5 is a profile cross-sectional view of an inner member of a fluid atomizer viewed normal to the axis of the inner member, in accordance with some embodiments of the present disclosure.

FIGS. 2, 3, 4, and 5 provide additional views of the inner member 102. More specifically, FIG. 2 is an isometric view of the inner member 102, FIGS. 3 and 4 provide alternative profile views of the inner member 102, and FIG. 5 is a profile cross-sectional view of the inner member 102. FIGS. 3 and 4 view the inner member 102 along the axis A, while FIG. 5 provides a cross-sectional view taken normal to the axis A.

As shown in these figures, the inner member 102 may partly define a tangential conduit 122 that extends from an entry plenum 124 to an exit plenum 132. The tangential conduit 122 may spiral along the axis A as it extends between the entry plenum 124 and the exit plenum 132. The tangential conduit 122 may terminate at a terminal end 134 of the exit plenum 132.

The entry plenum 124 may have a first axial dimension and the exit plenum 132 may have a second axial dimension. The first axial dimension may be greater than the second axial dimension. The tangential conduit 122 may axially narrow as it extends from the entry plenum 124 to the exit plenum 132.

Fluid flow through the tangential conduit 122 may be directed into one or more of a plurality of swirl slots 126. The swirl slots 126 may extend between the tangential conduit 122 and an annulus 128 at least partly defined by the inner member 102. Fluid leaving the downstream side of the annulus 128 may be directed into one or more of a plurality of secondary swirl slots 138. The secondary swirl slots 138 may be in fluid communication between the annulus 128 and the discharge plenum 130 that may be at least partly defined by the inner member 102. The secondary swirl slots 138 may be referred to as exit slots.

As best illustrated in FIG. 3, the tangential conduit 122 extends from a terminal end 140 of the entry plenum 124 to a terminal end 134 of the exit plenum 132. The entry plenum 124 may be positioned proximate the second fluid supply conduit 118 in order to receive a flow of second fluid. The tangential conduit 122 may be in fluid communication with one or more of a plurality of swirl slots 126 partly defined by the inner member 102. The swirl slots 126 may direct the flow of second fluid from the tangential conduit 122 to the annulus 128 at least partly defined by the inner member 102.

The tangential conduit 122 may comprise a first axial limit 141 proximate the entry plenum 124 and a second axial limit 142 proximate the exit plenum 132. The first axial limit 141 and second axial limit 142 may be defined by an upstream wall 144 of the tangential conduit 122. The upstream wall 144 may define the upstream axial boundary of the tangential conduit 122 along all or part of the circumferential length of the tangential conduit 122.

The first axial limit 141 may have a first axial position AP1, and the second axial limit 142 may have a second axial position AP2. The first axial position AP1 may be displaced from the second axial position AP2. The first axial position AP1 may be upstream of the second axial position AP2. Thus the tangential conduit 122 may axially narrow as it extends from the entry plenum 124 to the exit plenum 132. The degree of axial narrowing may be measured by the axial distance AD between the first axial position AP1 and the second axial position AP2. The axial distance AD is greater than zero.

As illustrated in FIG. 4, each slot of the plurality of swirl slots 126 and the plurality of secondary swirl slots 138 may have a slot axis SA. One or more of the plurality of swirl slots 126 may provide fluid communication between the tangential conduit 122 and the annulus 128. One or more of the plurality of secondary swirl slots 138 may provide fluid communication between the annulus 128 and the discharge plenum 130. In some embodiments, the slot axis SA1 of one or more of the plurality of swirl slots 126 may be linear. In some embodiments, the slot axis SA2 of one or more of the plurality of secondary swirl slots 138 may be linear. In other embodiments, the slot axis SA2 of one or more of the plurality of secondary swirl slots 138 may be helical.

The inner member 102 may optionally comprise a braze ring groove 141. The braze ring groove 141 may assist with coupling of the inner member 102 and upstream outer member 104.

As illustrated in FIG. 5, the tangential conduit 122 may become shallower as it proceeds from the entry plenum 124 to the exit plenum 132. A first radial dimension RD1 of the entry plenum 124 may be measured at or proximate to the terminal end 140 of the entry plenum 124. A second radial dimension RD2 may be measured at or proximate to the terminal end 134 of the exit plenum 132. The first radial dimension RD1 may be greater than the second radial dimension RD2.

FIG. 5 additionally illustrates the circumferential spacing of the entry plenum 124 and exit plenum 132. The spacing may be measured as a circumferential distance D between the terminal end 140 of the entry plenum 124 and the terminal end 134 of the exit plenum 132. The circumferential distance D is greater than zero, indicating that the entry plenum 124 and exit plenum 132 are circumferentially spaced. The circumferential spacing of the entry plenum 124 and exit plenum 132 results in a non-annular tangential conduit 122.

The spacing of the entry plenum 124 and exit plenum 132 may also be measured by the angle θ between a first radius R1 and second radius R2. The first radius R1 extends between the axis A and the terminal end 140 of the entry plenum 124. The second radius R2 extends between the axis A and the terminal end 134 of the exit plenum 132. The angle θ between the first radius R1 and second radius R2 is greater than zero, indicating that the entry plenum 124 and exit plenum 132 are circumferentially spaced. The circumferential spacing of the entry plenum 124 and exit plenum 132 results in a non-annular tangential conduit 122.

The terminal end 134 of the exit plenum 132 may be circumferentially displaced from the terminal end 140 of the entry plenum 124. The tangential conduit 122 extending between the entry plenum 124 and the exit plenum 132 may circumscribe the inner member 102 by less than 360 degrees. The terminal end 134 of the exit plenum 132 may be circumferentially displaced from the second fluid supply conduit 118. The tangential conduit 122 extending between the second fluid supply conduit 118 and the exit plenum 132 may circumscribe the inner member 102 by less than 360 degrees.

Figure 6:
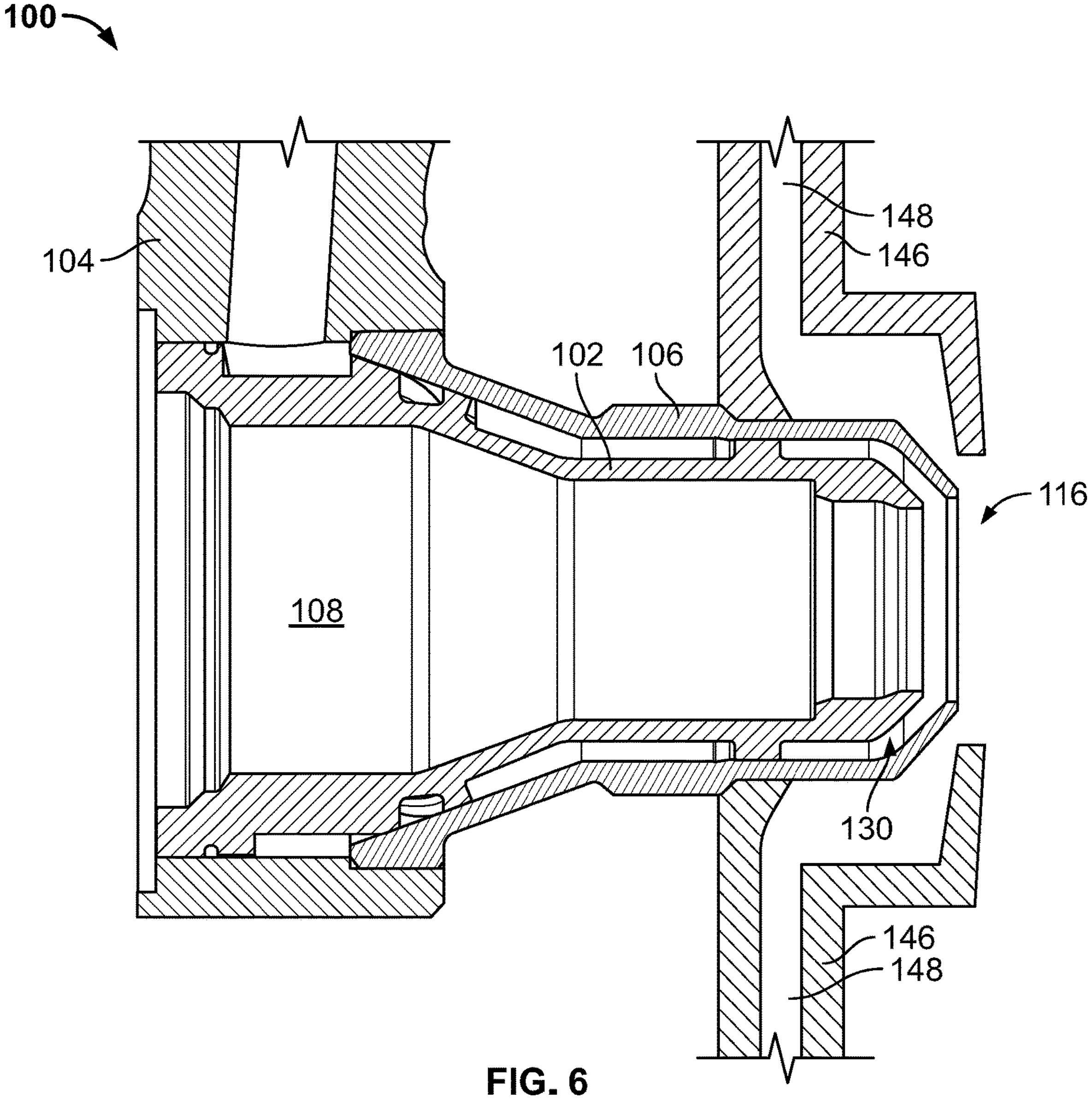
FIG. 6 is a schematic cross-sectional view of a fluid atomizer in accordance with some embodiments of the present disclosure.
Figure 8:
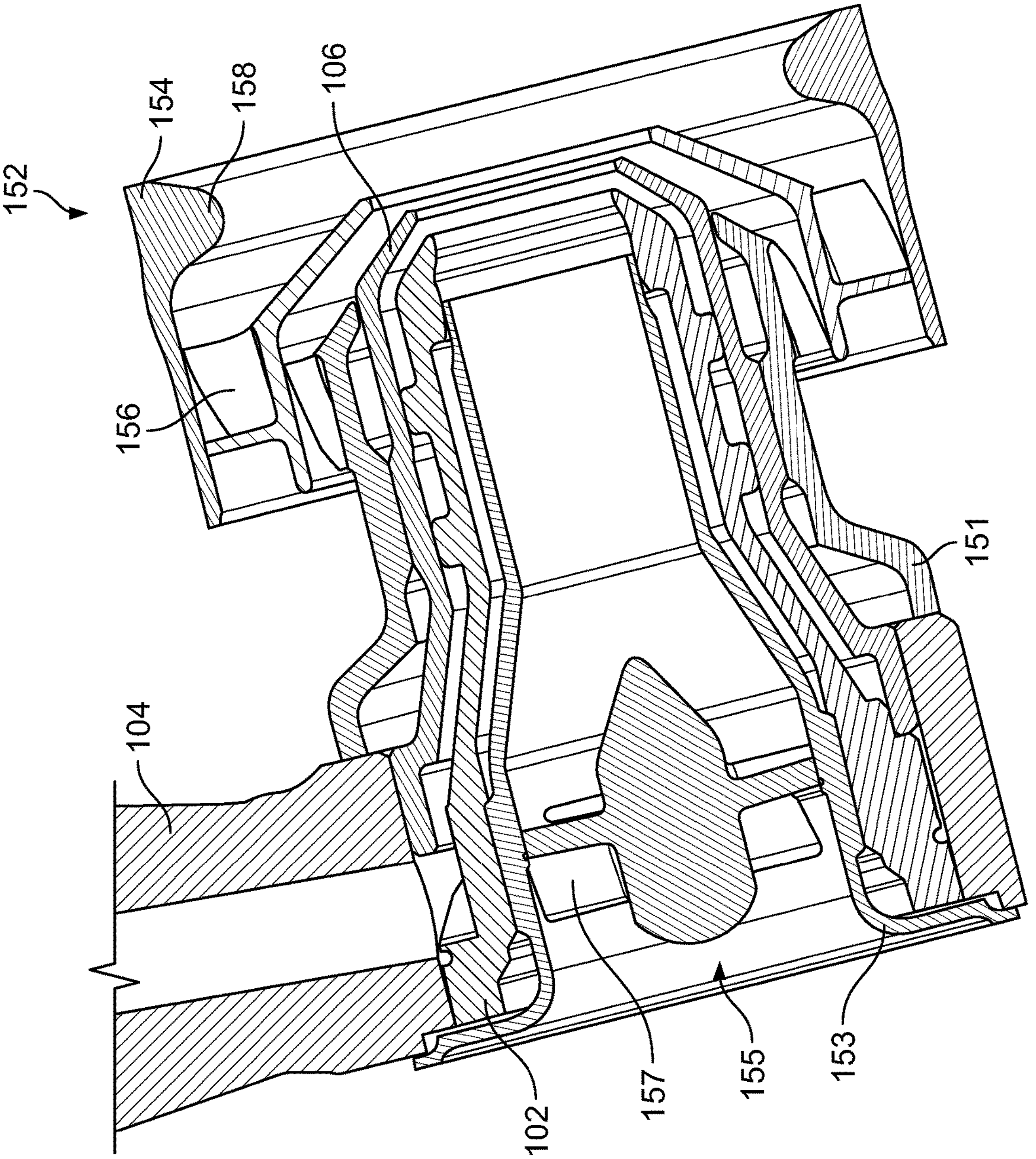
FIG. 8 is a schematic cross-sectional view of a fluid atomizer in accordance with some embodiments of the present disclosure.

In some embodiments, the fluid atomizer 100 may comprise additional structures for supplying a first fluid. FIGS. 6 and 8 provide schematic cross-sectional views of such embodiments.

As shown in FIG. 6, in some embodiments a first fluid may be supplied from a location radially outward of the inner member 102. The fluid atomizer 100 may further comprise a first fluid conduit 146 that defines a first fluid flowpath 148. The first fluid flowpath 148 may direct a first fluid under pressure toward the discharge end 116 of the fluid atomizer 100, where the first fluid may mix with and atomize the second fluid as it exits the discharge plenum 130. The first fluid conduit 146 may be positioned radially outward of the inner member 102 and/or the downstream outer member 106.

As shown in FIG. 8, in some embodiments a first fluid may be supplied from one or both of a radially inward location and a radially outward location of the inner member 102. For example, the fluid atomizer 100 may comprise an outer first fluid member 152 and an inner first fluid member 153.

The outer first fluid member 152 may be disposed radially outward of the downstream end 112 of the inner member 102. The outer first fluid member 152 may comprise an outer shroud 154 bounding a plurality of radially-extending vanes 156. The shroud 154 may define flowpath features 158 that direct flow of a first fluid in a radially inward direction. A first fluid may be supplied under pressure to the outer first fluid member 152 by a first fluid conduit (not shown in FIG. 8).

The inner first fluid member 153 may be positioned radially inward of the inner member 102. The inner first fluid member 153 may be disposed at least partly within the first fluid flowpath 108. The inner first fluid member 153 may comprise a swirler 155 and a plurality of vanes 157. The inner first fluid member 153 may direct a first fluid to or toward the discharge end 116. A first fluid may be supplied under pressure to the inner first fluid member 153 by a first fluid conduit (not shown in FIG. 8).

As shown in FIG. 8, the fuel atomizer 100 may further comprise an atomizer shroud 151 that at least partly encases a portion of the inner member 102, upstream outer member 104, and/or downstream outer member 106.

Figure 7:
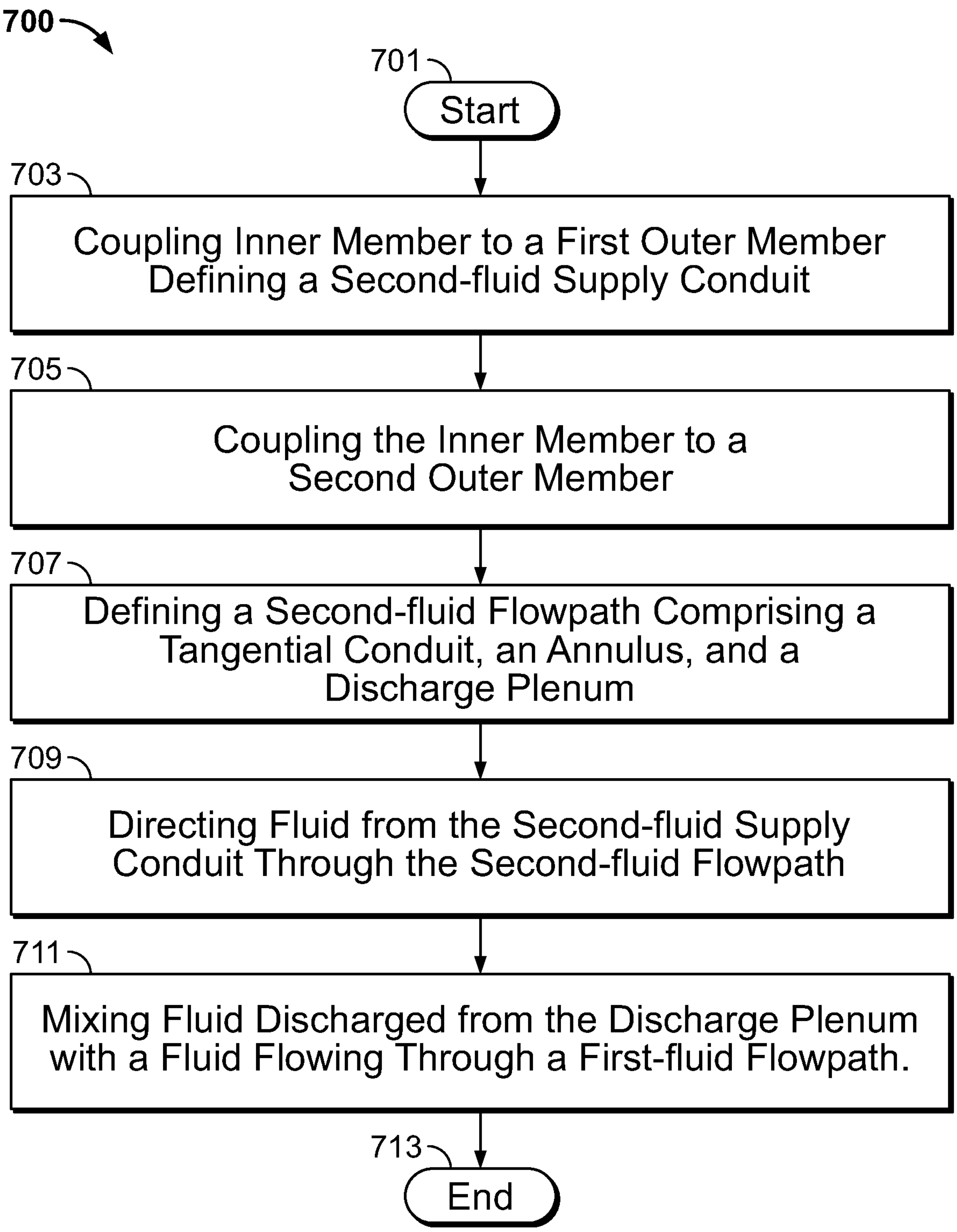
FIG. 7 is a flow diagram of a method in accordance with some embodiments of the present disclosure.

The present disclosure additionally provides methods of atomizing a fluid. A flow diagram of one such method is presented at FIG. 7. The method 700 begins at Block 701.

At Block 703 an inner member 102 is coupled to a first outer member that defines a second fluid supply conduit 118. The first outer member may be upstream outer member 104. The first outer member may be positioned radially outward from the inner member 102 and/or a portion of the inner member 102 and/or the axis A. The first outer member may be positioned proximate the upstream end 110 of the inner member 102. The second fluid supply conduit 118 may direct a second fluid in a radially inward direction, and may direct the second fluid toward the inner member 102.

At Block 705 the inner member 102 is coupled to a second outer member. The second outer member may be downstream outer member 106. The second outer member may be positioned radially outward from the inner member 102 and/or a portion of the inner member 102 and/or the axis A. The second outer member may be annular, and may be co-axial with the inner member 102. The second outer member may be positioned proximate the downstream end 112 of the inner member 102.

At Block 707, a second fluid flowpath 120 is defined by the inner member 102 and first and second outer members. The second fluid flowpath 120 may comprise a tangential conduit 122, a plurality of swirl slots 126, an annulus 128, and a discharge plenum 130. The tangential conduit 122 may extend from an entry plenum 124 in fluid communication with the second fluid supply conduit 118 to an exit plenum 132 spaced circumferentially from and axially downstream of the entry plenum 124. The tangential conduit 122 may spiral along the axis A from the second-fluid supply conduit 118 to a terminal end 134. The annulus 128 may be positioned downstream from and in fluid communication with the tangential conduit 122. The discharge plenum 130 may be positioned downstream from and in fluid communication with the annulus 128.

At Block 709, second fluid may be directed from the second fluid supply conduit 118 through the second fluid flowpath 120. The second fluid may be directed under pressure through the second fluid flowpath 120 and ejected from the discharge plenum 130. The second fluid may flow from the entry plenum 124 of the tangential conduit 122 into one or more of the plurality of swirl slots 126, then into the annulus 128 and discharge plenum 130 before being ejected under pressure from the discharge plenum 130.

At Block 711, second fluid discharged from the discharge plenum 130 may be mixed with a first fluid flowing through a first fluid flowpath 108. The first fluid may be directed under pressure through the first fluid flowpath 108. In some embodiments, a flow of first fluid may be provided exterior to the inner member 102, for example via a first fluid conduit 146 defining a first fluid flowpath 148 and positioned radially outward from the downstream outer member 106. The mixing of the second fluid discharged from the discharge plenum 130 and the first fluid may cause atomization of the second fluid.

In some embodiments of method 700, the first fluid is air and the second fluid is fuel.

Method 700 ends at Block 713.

The systems and methods presented herein provide numerous benefits over fluid atomizers of the prior art. Notably, the disclosed fluid atomizer does not require complex machining in order to manufacture the inner member. Instead, the inner member swirl slots are disclosed as having linear axes, thus requiring a linear cut rather than any complex machining. The linear axis of each swirl slot allows for straight swirl slot cuts into the generally conic surface of the inner member, thus enabling an easily controlled depth of cut and depth of the resulting swirl slot.

Similarly, the tangential conduit of the inner member may be cut into the inner member using a mill cutter having a width larger than the width of the tangential conduit. In other words, the mill cutter may cut the tangential conduit while extending off the surface of the inner member, or with the mill cutter extending over the edge of the conical surface of the inner member. This allows for a quicker and more efficient manufacture of the tangential conduit, the ability to manufacture the inner race on a wider range of machining tools, and less blade wear of the cutting tools.

As described above, the tangential conduit axially narrows and becomes radially more shallow at it extends from the entry plenum to the exit plenum. This geometry of the tangential conduit allows for maintaining the fluid velocity as it progresses along the tangential conduit and is distributed into the plurality of swirl slots.

The co-swirling or counter-swirling directions of second fluid flow through the annulus is advantageous to maintain fluid velocity through the second fluid flowpath and to equally distribute the second fluid downstream from the annulus.

The presently disclosed fluid atomizer therefore replicates the fluid and thermal performance of a complexly machined and expensive fluid atomizer, but that performance is achieved at a reduced cost and greater ease of manufacture. The disclosed fluid atomizer controls fluid distribution and residence time, and minimizes or eliminates stagnant flow regions.

Although examples are illustrated and described herein, embodiments are nevertheless not limited to the details shown, since various modifications and structural changes may be made therein by those of ordinary skill within the scope and range of equivalents of the claims.

What is claimed is:

1. A method of atomizing a fluid, the method comprising:

coupling an inner member having an axis and defining an interior first-fluid flowpath to a first outer member defining a second-fluid supply conduit;

coupling the inner member to a second outer member, the second outer member positioned radially inward from a portion of the first outer member and radially outward of the inner member, the second outer member extending axially from the first outer member to a downstream end of the inner member, wherein the inner member, the first outer member, and the second outer member define a second-fluid flowpath, and the second-fluid flowpath comprising a tangential conduit spiraling along said axis from said second-fluid supply conduit to a terminal end, an annulus downstream from and in fluid communication with the tangential conduit, and a discharge plenum downstream from and in fluid communication with said annulus, the annulus extending axially between the inner member and the second outer member from the terminal end to the discharge plenum; and directing the fluid from the second-fluid supply conduit through the second-fluid flowpath; and directing the fluid from an entry plenum in fluid communication with an outlet of the second-fluid supply conduit to an exit plenum spaced circumferentially from and axially downstream of said entry plenum via a conduit, the entry plenum disposed between (1) a downstream end of the first outer member and (2) the inner member, wherein the downstream end of the first outer member is coupled to an upstream end of the second outer member.

2. The method of claim 1 further comprising mixing the fluid discharged from the discharge plenum with a fluid flowing through the first-fluid flowpath.

3. The method of claim 1 further comprising directing the fluid through a plurality of swirl slots included in the second-fluid flowpath between said exit plenum and said annulus.

4. The method of claim 1 further comprising directing the fluid thorough one or more swirl slots included in the second-fluid flowpath between said exit plenum and said annulus, wherein an axis extending through a center of one or more swirl slots lies in a single plane.

5. The method of claim 1 wherein the fluid flows from the entry plenum, the entry plenum having a radial dimension greater than a radial dimension of the exit plenum.

6. The method of claim 1 wherein the fluid flows from the entry plenum, the entry plenum having an axial dimension greater than an axial dimension of the exit plenum.

7. The method of claim 1 wherein the terminal end is circumferentially displaced from the second-fluid supply conduit so that the tangential conduit extending therebetween circumscribes the inner member by less than 360 degrees.

8. The method of claim 1 further comprising directing the fluid through a plurality of swirl slots included in the second-fluid flowpath between said discharge plenum and said annulus.

9. The method of claim 1 further comprising directing the fluid thorough one or more swirl slots included in the second-fluid flowpath between said discharge plenum and said annulus, wherein an axis extending through a center of one or more swirl slots lies in a single plane.

10. The method of claim 1 further comprising directing the fluid through a first-fluid conduit positioned radially outward of the second outer member.

11. The method of claim 1 wherein the fluid flows through the tangential conduit, wherein the tangential conduit is partially bounded by an upstream wall, and wherein the upstream wall has a first axial position proximate the entry plenum and a second axial position proximate the exit plenum, the first axial position displaced from the second axial position.

12. The method of claim 1 further comprising forming the first outer member and the second outer member as a unitary member.

13. A method of atomizing a fluid, the method comprising:

coupling an inner member to one or more outer members positioned radially outward of the inner member, the inner member having an axis and defining an interior first-fluid flowpath from a supply end of a fluid atomizer to a discharge end of the fluid atomizer, the inner member and outer members defining a second-fluid flowpath extending from a second-fluid supply conduit proximate the supply end of the fluid atomizer to a second-fluid discharge plenum proximate the discharge end of the fluid atomizer, the second-fluid flowpath comprising a tangential conduit spiraling along said axis as the tangential conduit extends from an entry plenum in fluid communication with the second-fluid supply conduit to a terminal end of an exit plenum space axially downstream of the entry plenum, an annulus downstream from and in fluid communication with the tangential conduit, and the second-fluid discharge plenum downstream from and in fluid communication with said annulus, wherein the annulus extends axially between the inner member and the one or more outer members from the exit plenum to the second-fluid discharge plenum, the fluid flows from the entry plenum through the tangential conduit, the tangential conduit terminates at the exit plenum, the entry plenum disposed between (1) a downstream end of a first outer member of the one or more outer members and (2) the inner member, and the downstream end of the first outer member is coupled to an upstream end of the second outer member; and directing the fluid from the second-fluid supply conduit through the second-fluid flowpath.

14. The method of claim 13 further comprising directing the fluid through a plurality of swirl slots included in the second-fluid flowpath providing fluid communication between the tangential conduit and the annulus.

15. The method of claim 13 further comprising directing the fluid through a plurality of swirl slots included in the second-fluid flowpath providing fluid communication between the tangential conduit and the annulus, wherein an axis extending through a center of one or more swirl slots lies in a single plane.

16. The method of claim 13 wherein the fluid flows through the tangential conduit, wherein the tangential conduit circumscribes the inner member by less than 360 degrees.

17. The method of claim 13 further comprising coupling an inner first-fluid member to the inner member, the inner first-fluid member positioned radially inward of the inner member.

18. A method of atomizing a fluid, the method comprising:

coupling an inner member to a first outer member, the inner member having an axis and defining an interior first-fluid flowpath extending from an upstream end of the inner member to a downstream end of the inner member along the axis, the first outer member positioned radially outward from a portion of the inner member proximate the upstream end of the inner member, the first outer member defining a second-fluid supply conduit;

coupling the inner member to a second outer member, the second outer member positioned radially inward from a portion of the first outer member and radially outward of the inner member, the second outer member extending axially from the first outer member to the downstream end of the inner member, wherein the inner member, the first outer member, and the second outer member define a second-fluid flowpath extending from the second-fluid supply conduit to the downstream end of the inner member, the second-fluid flowpath comprising a conduit extending from an entry plenum in fluid communication with the second-fluid supply conduit to an exit plenum spaced circumferentially from and axially downstream of the entry plenum, an annulus downstream from and in fluid communication with the exit plenum, and a discharge plenum downstream from and in fluid communication with the annulus, wherein the annulus extends axially between the inner member and the second outer member from exit plenum to the discharge plenum, and the entry plenum is disposed between (1) a downstream end of the first outer member and (2) the inner member; and directing the fluid from the second-fluid supply conduit through the second-fluid flowpath.

* * * * *